Nov. 7, 1933.  E. A. BEYL  1,934,481

ADJUSTABLE AUTOMATIC TAKE-UP FOR BELTS

Filed March 30, 1931  2 Sheets-Sheet 1

Inventor:
Emil A. Beyl.
By
Reif & Braddock
Attorneys

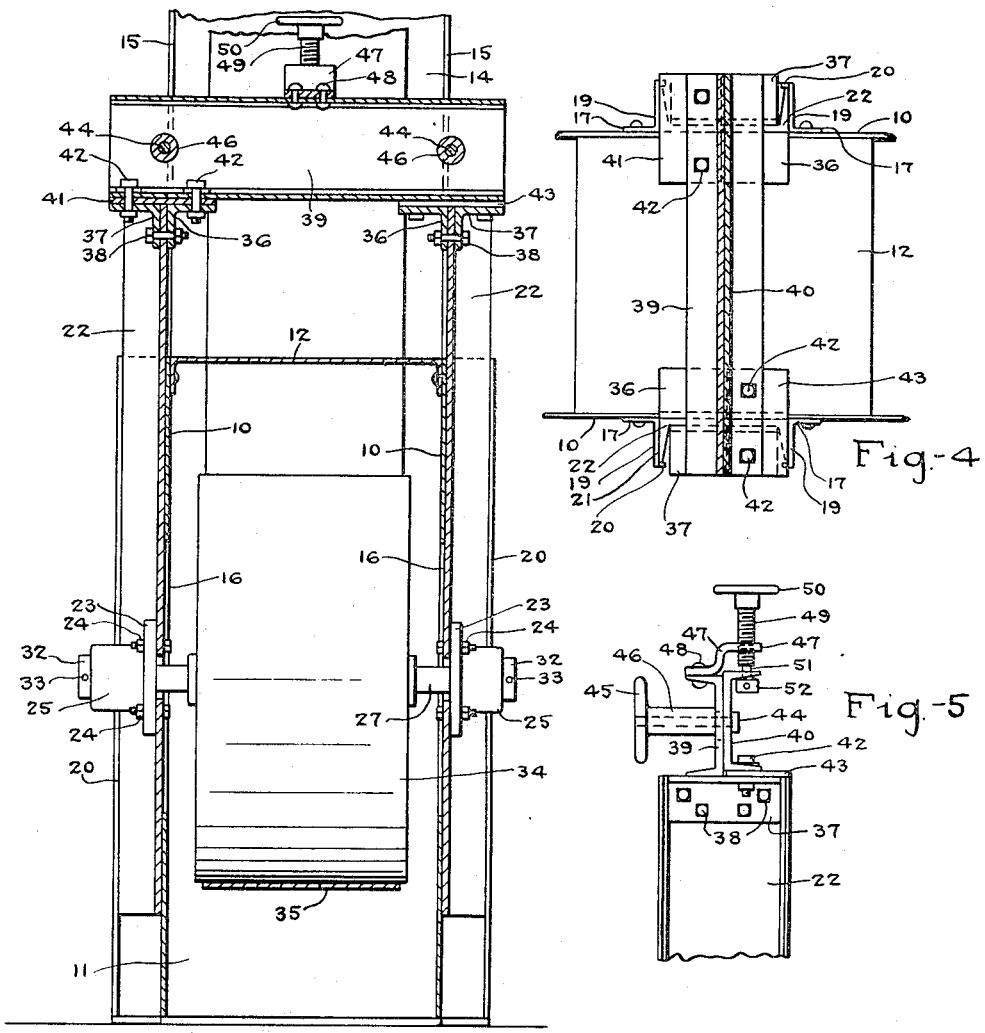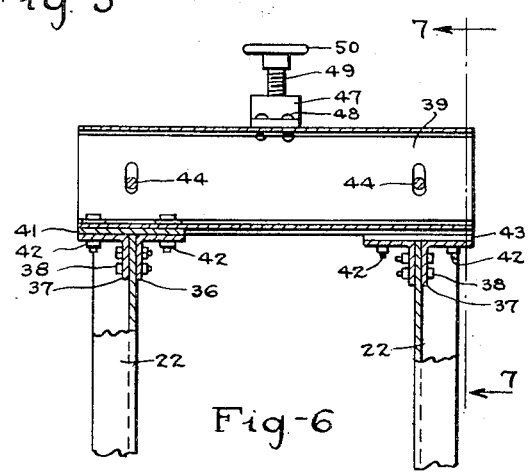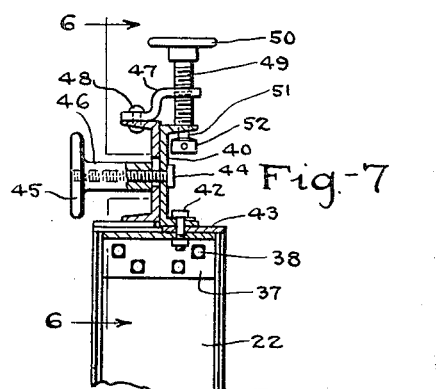

Patented Nov. 7, 1933

1,934,481

UNITED STATES PATENT OFFICE 1,934,481

ADJUSTABLE AUTOMATIC TAKE-UP FOR BELTS

Emil A. Beyl, Minneapolis, Minn., assignor to Link Belt Supply Company, Minneapolis, Minn., a corporation of Minnesota Application March 30, 1931. Serial No. 526,149

11 Claims. (Cl. 308—12)

This invention relates to an adjustable automatic takeup for an endless member running over a pulley at its lower end, such for example, as an elevator belt commonly employed in mills, a conveyor belt, ordinary drive belt or other endless member. The purpose is to automatically maintain the endless member under an even and uniform tension irrespective of any shrinkage or slacking of the endless member during its operation in use.

One object of the invention is to provide a bearing structure for the lower pulley end of an endless member, in which will be incorporated various novel and improved features and characteristics of construction designed to render the said bearing structure decidedly more efficient and satisfactory in the performance of its intended service than is any bearing structure heretofore known for the same general purpose.

Another object of the invention is to provide an adjustable automatic tensioning elevator boot bearing structure including novel and improved means for readily accomplishing alining adjustments of a boot pulley adapted to better insure smooth and even travel of an endless elevator belt over said boot pulley.

A further object is to provide a bearing structure for an elevator boot or other endless member including novel and improved means for readily and easily accomplishing relative adjustments in vertical direction of opposite bearings carrying a generally horizontal shaft supporting the boot pulley of said elevator boot, whereby to oscillatably adjust said boot pulley in a vertical plane and relatively to an endless elevator belt travelling over the pulley to center said belt on said pulley.

It is still another object of the invention to provide a structure including self-alining bearings for the lower pulley shaft of said endless member rigidly secured in position, which bearings support said shaft and the pulley thereon, no matter to what position said shaft may be adjusted in a particular instance, to thus obtain true running of said endless elevator belt over said boot pulley.

With the above objects in view, as well as others which will appear as the specification proceeds, the invention comprises the construction, arrangement and combination of parts as now to be fully described and as hereinafter to be specifically claimed. It is to be understood, however, that the disclosure herein is merely illustrative and intended in no way in a limiting sense, changes in details of construction and arrangement of parts being permissible as long as within the spirit of the invention and the scope of the claims which follow.

In the accompanying drawings forming a part of this specification,

Fig. 3 is a vertical sectional view taken on line 3—3 in Fig. 1;

Fig. 4 is a detail sectional view taken on line 4—4 in Fig. 1;

Fig. 5 is a detail view of the means for adjusting the bearing structure, the present view being a fragment of the device shown in elevation;

Fig. 6 is a detail sectional view taken as on line 6—6 in Fig. 7; and

Fig. 7 is a detail view corresponding generally with the disclosure of Fig. 5, the present view being a section taken as on line 7—7 in Fig. 6, and illustrating the parts disclosed in Fig. 5 in different positions.

Figure 1:
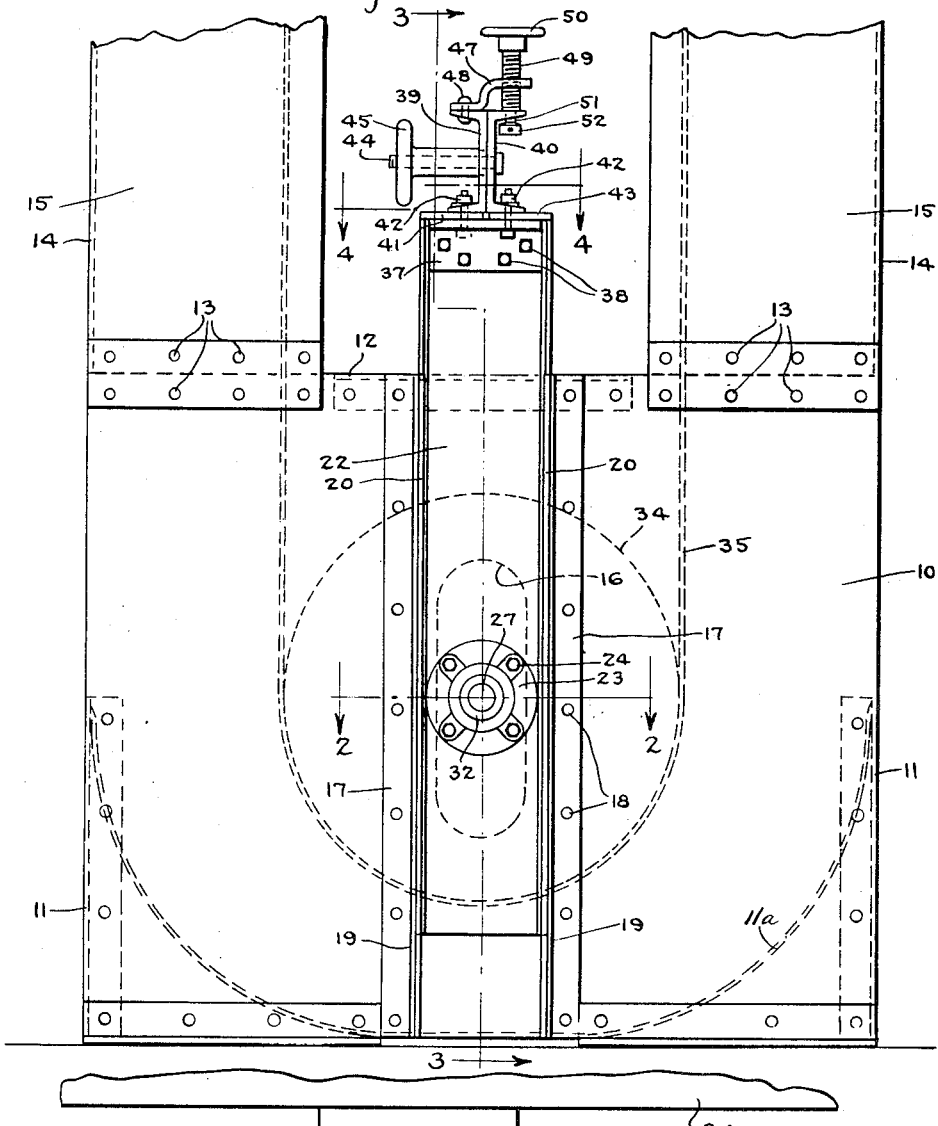
Fig. 1 is a side elevational view of an elevator boot bearing structure in which the features of the invention are incorporated.

With respect to the drawings and the numerals of reference thereon, the present structure comprises a housing including side walls 10, end walls 11, and a top wall 12, and while this housing may be of various shapes, it is shown as rectangular in horizontal cross section. Said walls 10, 11 and 12 may be connected with each other in any suitable manner to provide a housing of substantial construction. These walls are shown as connected by curved bottom portions 11a. Spouts or legs also illustrated as rectangular in horizontal cross section are securely attached to the opposite end portions of the housing at the top thereof, as at 13, and extend upwardly from said housing, each spout or leg consisting of an end wall 14 desirably in alinement with an end wall 11, and side walls 15 which extend inwardly from the end wall 14 and desirably aline with the side walls 10. Corresponding side walls 15 of the different spouts or legs are desirably spaced apart in about the manner as best shown in Fig. 1.

Each side wall 10 of the said housing includes an elongated vertical slot 16, each slot 16 desirably being arranged at about the midwidth and midheight of the corresponding side wall and having its upper and lower ends curved as best shown in dotted lines in Fig. 1.

Figure 2:
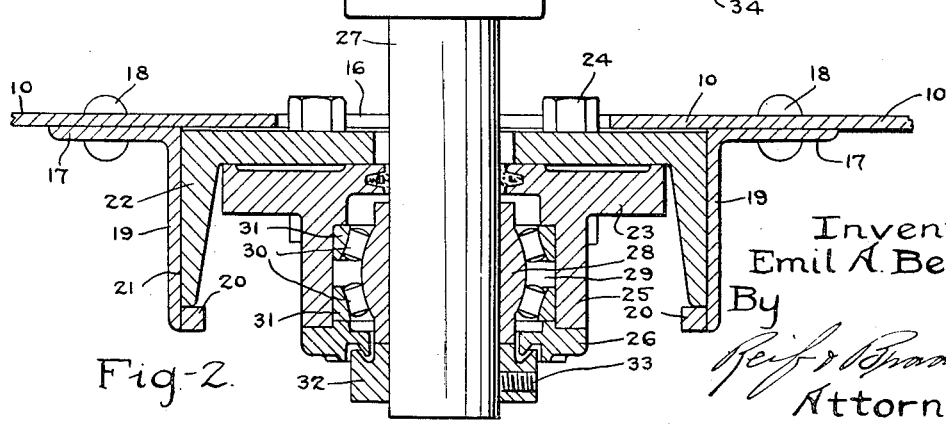
Fig. 2 is a detail sectional view taken on line 2—2 in Fig. 1.

Each side wall 10 fixedly supports a pair of vertical angle bars which are arranged adjacent the opposite sides of the corresponding elongated slot 16, and each angle bar includes an arm 17 attached to the outer face of a side wall 10, as at 18, and an arm 19 which extends outwardly from the side wall in perpendicular relation thereto. A metal strip 20, which is shown as rectangular in cross section, is welded to each of the inner or adjacent sides of the arms 19 at the free edges of said arms. The angle bars, each including arms 17 and 19, attached to a side wall 10, together with the corresponding side wall and strips 20, provide a vertical guide channel 21 at each side of the housing, adjacent the elongated slots 16 in the side walls thereof, and each guide channel 21 slidably receives a channel member 22. Said channel members 22 are as disclosed of U-shape in cross section and of some considerable length. The channel members 22 are preferably regular structural steel channel pieces the web of each of which is arranged in contiguous relation with a side wall 10 and the flanges of each of which are arranged in contiguous relation to corresponding arms 19, the outer ends of the flanges of each channel member 22 desirably terminating in close proximity to the corresponding strips 20. A bearing 23, which lies in the channel of each member 22, is securely bolted to the lower portion of the web of each channel member, as by headed and nutted bolts 24. Portions of said headed and nutted bolts 24 which project inwardly beyond the web of each channel member 22 lie well within the confines of the corresponding elongated slot 16, as will be most clear from Figs. 2 and 3. Each bearing 23 is of the type commonly known as a self-alining roller bearing, and includes a case 25 with removable cover 26 housing the operative parts of the bearing. As disclosed, the cases and covers of the roller bearings 23 have openings for freely receiving the opposite end portions of a boot pulley shaft 27 and spherical elements 28 upon said opposite end portions. Each spherical element 28 lies in a pocket 29 provided by a case 25 and cover 26. The spherical members 28 are each mounted upon spaced apart sets of rollers 30 which lie in the corresponding pocket 29 and surround said spherical member, and said sets of rollers 30 are mounted in annular rings 31 which are suitably seated in the case 25 and the cover 26 in about the manner as shown in Fig. 2. The structure of each bearing 23 is completed by a collar 32 fixed upon the outer end portion of the shaft 27, as by a set screw 33, said collar 32 at each end of the shaft 27 being in engagement with the outer end of the corresponding spherical element 28 and overlying the inner margin of the outer face of the corresponding cover 26.

The shaft 27 carries a boot pulley 34, and an endless elevator belt 35 travels over said boot pulley and extends upwardly in the spouts or legs of the structure. The housing and the spouts or legs function as an enclosure for the endless elevator belt, which belt is conveniently supported at its upper portion, in a manner not shown, for continuous traveling movement.

It will be seen that when the lower portion of the endless elevator belt 35 is arranged about the boot pulley 34, said belt provides a support for said boot pulley, and the pulley and the channel members 22 and the parts which said channel members support, hang on the belt. Said boot pulley and the parts which support the pulley for vertical sliding movement in the manner as set forth all together comprise considerable weight which properly tensions the belt. As the belt stretches, the stretch is taken up by the weight, and the shaft 27 moves downwardly in the elongated slots 16. As the belt shrinks, the opposite occurs. That is, the shaft 27 moves upwardly in said elongated slots 16. In the disclosure as made, the weight of the boot pulley and its associated parts will predetermine the tension upon the endless elevator belt and will keep the tension upon said belt uniform. The guide members for the bearings 23 assure upward and downward movement of the boot pulley in even and smooth manner, and the present elevator boot will, obviously, maintain the endless elevator belt under a predetermined and fixed tension irrespective of the stretched or shrunk condition of said belt. The present device thus automatically holds the elevator belt under proper tension to assure efficient operation of said belt at all times.

An important feature of the present invention is the provision in the bearing structure of means for readily and easily accomplishing relative vertical adjustments of the bearings 23 to in turn accomplish vertical, oscillatory adjustment of the boot pulley shaft 27 adapted to position the surface of the boot pulley 34, over which the endless elevator belt rides, in alining relation with said belt, to thus properly position or center said belt on said pulley.

Each channel member 22 extends upwardly above the upper extremities of the side walls 10 of the housing and the vertical angle bars attached to said side walls, said angle bars as shown terminating flush with the upper wall 12 of the housing. The upper ends of the channel members 22 terminate in approximately the same horizontal plane. A transversely extending angle member 36 is attached to the upper extremity of each of the channel members 22 having an inwardly extending horizontal flange, and a transversely extending angle member 37 is also attached to the upper extremity of each of said channel members 22, having an outwardly extending horizontal flange. As shown, vertical flanges of adjacent angle members 36 and 37 are attached to each channel member 22 by headed and nutted bolts 38, and the horizontal flanges of said adjacent angle members 36 and 37 terminate flush with the upper edge of the corresponding channel member. See Fig. 3.

A pair of horizontally disposed channel members, designated 39 and 40, respectively, extend between the opposite channel members 22, as best shown in Figs. 3 and 4, said channel members 39 and 40 having their webs disposed vertically, back to back, and their flanges directed outwardly in opposite directions, as will be clear from Figs. 1, 4, 5 and 7. The channel member 39 rests at one of its end portions on a plate 41. The plate 41 rests on the angle members 36 and 37 which are attached to the channel member 22 at this same side of the device, and said channel member 39, said plate 41, and said channel member 22 are secured together by headed and nutted bolts 42 which pass through the lower flange of said channel member 39, said plate 41, and said angle members 36 and 37. The end portion of the channel member 40 at this same side of the device is unattached and is vertically spaced from the mentioned angle members 36 and 37 a distance equal to the thickness of the plate 41. The opposite end portion of said channel member 40 rests on a plate 43 similar to the plate 41. The plate 43 rests on the angle members 36 and 37 which are attached to the channel member 22 at the corresponding side of the device, and said channel member 40, said plate 43, and said channel member 22 are secured together by headed and nutted bolts 42 which pass through the lower flange of said channel member 40, said plate 43, and said angle members 36 and 37. The end portion of the channel member 39 at this same side of the device is unattached and is vertically spaced from the corresponding angle members 36 and 37 a distance equal to the thickness of the plate 43.

A horizontal headed screw 44 extends through an opening in the web of the channel member 40 and through an elongated, transverse opening in the web of the channel member 39 adjacent each end portion of said channel members 39 and 40. Said screw 44 has a clamping hand wheel 45 threaded thereon, and said hand wheel includes an elongated hub 46 adapted to engage the channel member 39 when the hand wheel is turned home on said screw 44, to thus clamp the webs of the channel members 39 and 40 between the head of said screw 44 and said elongated hub 46 and hold said members in fixed position.

A bracket 47 is secured to the midlength of the upper flange of the channel member 39, as at 48, and said bracket 47 is offset to extend upwardly and horizontally above the upper flange of the channel member 40. A vertical screw 49 is threadably received in the horizontal portion of the bracket 47, and has a hand wheel 50 at its upper end for the purpose of manipulating said screw 49. The lower end of the screw 49 integrally supports a reduced portion 51, and said reduced portion 51 has thereon a collar 52 with a beveled upper surface in spaced relation to said screw 49, said collar 52 being suitably pinned to said reduced portion. The reduced portion 51 is situated in an opening in the upper flange of the channel member 40, and the lower end of the screw 49 and the beveled upper surface of the collar 52 are arranged in close proximity to the upper and lower surfaces, respectively, of said upper flange.

As hereinbefore stated, the channel members 22 are vertically slidable in the guide channels 21, and the bearings 23 are rigidly bolted to said channel members 22, respectively. Said channel members 22, together with the channel members 39 and 40, the boot pulley 34, the shaft 27, the bearings 23, etc., provide a weighted belt tensioning mechanism tending to move downwardly by gravity along the guide channels 21 to place the desired and predetermined tension on the endless elevator belt 35. It is essential that said belt 35 remain centrally disposed upon the boot pulley 34 during the traveling movement of said belt over said boot pulley to insure smooth and even travel of the belt. It will be obvious that should the endless elevator belt move to one side or the other of the boot pulley, said belt can be brought back to central position by turning the hand wheel 50 in proper direction to thus rotate the screw 49. When said screw 49 is rotated in clockwise direction it pushes down on the channel member 40 and pulls up on the bracket 47 and the channel member 39, as shown in Figs. 6 and 7, and as will be obvious. This action elevates the plate 41 and the corresponding channel member 22 which is attached to the channel member 39, and depresses the other channel member 22. The relative adjustment of the channel members 22 of course oscillatably adjusts the shaft 27 in vertical direction. When said screw 49 is rotated in counter-clockwise direction it pulls up on the channel member 40 and pushes down on the bracket 47 and the channel member 39, as shown in Fig. 5. This action elevates the plate 43 and the corresponding channel member 22 which is attached to the channel member 40, and depresses the other channel member 22. Thus, it will be seen, relative vertical movement of the channel members 39 and 40 imparts relative vertical movement to the different channel members 22 and vertical oscillatory movement in corresponding degree to the shaft 27 so that the boot pulley 34 can be canted or inclined in the intended direction and to the requisite extent to cause the endless elevator belt and said boot pulley to be properly alined and said elevator belt to become centered on said pulley, as will be understood. When the endless belt is thus centered on the boot pulley, the hand wheels 45 are turned home to clamp the webs of the channel members 39 and 40 against each other, and said channel members 39 and 40 are thus held in rigidly fixed relation. Of course the hand wheels 45 must be loosened before the hand wheel 50 can be turned to make a vertical oscillatory adjustment of the shaft 27. It will be evident that the relative vertical adjustments of the channel members 22 are limited to the thickness of a plate 41 or 43, said plates as shown being of equal thickness.

It will be apparent from the description given that when the boot pulley shaft 27 is oscillated in either direction toward or from the horizontal, to thus cant or incline the boot pulley 34, the self-alining roller bearings 23 will automatically adjust themselves to at all times properly support said boot pulley shaft and said boot pulley for free and easy rotation.

The endless elevator belt 35 and the boot pulley 34 when once set in properly adjusted, alining relation cannot readily get out of adjustment. Any tendency toward vertical oscillatory movement of the shaft 27 during the traveling of the belt 35 over the boot pulley will be readily responded to by tendency toward rocking adjustments of the spherical elements 28 in their bearings, and when the tendency toward vertical oscillatory movement of said shaft 27 becomes removed, said spherical elements 28 will just as readily tend to return to their self-alining and natural positions in said bearings 23. Said shaft 27 will, obviously, be fixed against the possibility of permanent distortion from a set position as long as tne members 39 and 40 are rigidly clamped to each other.

The lower ends of the channel members 22 can terminate at sufficient distance below the outer surface of the boot pulley 34 to insure that buckets, etc., which may be carried by the endless elevator belt 35, will not accidently strike a surface beneath said boot pulley. Or the limit of downward movement of the boot pulley can be predetermined by the elevation of the lower ends of the elongated slots 16, as will be understood.

It will be evident that tension can be taken off of the endless elevator belt 35 at any time this may be desirable by simply lifting the boot pulley 34, together with the other parts supported upon said belt through said boot pulley.

From the above description it is seen that applicant has provided a very simple and yet very efficient weighted boot structure. The desired tension is maintained on the belt at all times and any stretching of the belt is automatically taken up. Means are provided for keeping the belt centrally located on the pulley and these means are easily and quickly operated. The vertically movable members which are guided at the sides of the housing permit the use of the self-alining bearing which is rigidly secured to these members. It is thus unnecessary to have any screws or other adjusting means for moving the bearing to different positions in order to keep the pulley and belt properly located. The device is easily made from standard parts and is very rugged in structure. The same has been amply demonstrated in actual practice and found to be very successful and efficient.

It will, of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:—

1. An adjustable automatic bearing structure, comprising an endless belt, a vertically movable, weighted belt tensioning mechanism including a generally horizontal shaft carrying a rotatable pulley supported upon a depending portion of said belt, spaced self-alining bearings movable with said pulley and supporting the opposite end portions of said shaft, and a single means for simultaneously moving said bearings in opposite vertical directions to adjust said belt and pulley.

2. An adjustable automatic bearing structure, having in combination, a housing, a guideway secured to each side of the housing, a member vertically movable in each guideway, a bearing carried by each of said members, a shaft journaled in said bearings and extending through said housing, a pulley mounted on said shaft within said housing, a belt running around the lower side of said pulley, a member secured to each of said members above said housing and extending respectively toward the other member, means for relatively moving said last mentioned members vertically to relatively move said first mentioned members vertically, and means for clamping said last mentioned members in fixed relation.

3. An adjustable automatic bearing structure, having in combination, a housing having side members, a pair of angle bars secured in spaced relation at each side of said housing having outwardly directed flanges, said bars thus forming a guideway at each side of said housing, a channel bar movable vertically in each of said guideways, a self-alining bearing rigidly bolted to each of said channel bars, a shaft journaled in said bearings, and extending between the sides of said housing, said sides having vertical slots therein permitting vertical movement of said shaft, a pulley secured to said shaft within said housing, a belt extending around the lower end of said pulley, said channel bars, bearings, shafts and pulley being supported by said belt, members extending between the tops of said channel bars, one being secured to one of said channel bars and spaced from the other, and the other being secured to the other of said channel bars and spaced from said one channel bar, means for clamping said members together in rigid relation, and means for vertically moving said members to relatively vertically move said channel bars to cant said shaft and pulley and centralize said belt on said pulley.

4. The structure set forth in claim 3, said last mentioned members comprising channel bars having their webs substantially in contact back to back, and said last mentioned means comprising a screw, a bracket in which said screw is threaded, secured to one of said last mentioned channel bars, and engaging the other of said last mentioned channel bars.

5. In an elevator boot bearing structure, a pair of spaced apart, vertically reciprocable members, guides for said members, a self-alining bearing supported by each member, a shaft supported by said bearings, a boot pulley supported by said shaft, and means for accomplishing relative vertical movement of said members, said means comprising a pair of horizontally disposed channels arranged back to back and extending between said vertically reciprocable members, opposite end portions of said elements, respectively, being attached to said vertically reciprocable members, respectively, mechanism at the midlengths of said elements for accomplishing relative vertical adjustments thereof, and means for releasably clamping the opposite end portions of said elements to each other in adjusted positions.

6. The combination as specified in claim 5, and a spacing plate between each of said elements and the vertically reciprocable member to which it is attached.

7. In an elevator boot bearing structure, a pair of spaced apart, vertically reciprocable members, guides for said members, a self-alining bearing supported by each member, a shaft supported by said bearings, a boot pulley supported by said shaft, and means for accomplishing relative vertical movement of said members, said means comprising a pair of horizontally disposed members arranged in contiguous relation and extending between said vertically reciprocable members, opposite end portions of said members being respectively attached to said vertically reciprocable members, mechanism carried by said members for accomplishing relative vertical adjustments thereof, and means for clamping said members to each other in adjusted positions, said last mentioned means comprising a screw passing through an opening in one of said members and an elongated transverse slot in the other member, and a clamping member threaded upon each screw.

8. In an elevator boot bearing structure, a pair of spaced apart, vertically reciprocable members, guides for said members, a self-alining bearing supported by each member, a generally horizontal shaft supported by said bearings, a boot pulley supported by said shaft, and means for accomplishing relative vertical movement of said members, said means comprising a pair of channel members having their webs arranged horizontally, a bracket attached to the midlength of the upper flange of one of said channel members and extending above the midlength of the upper flange of the other channel member, a vertical screw arranged in said bracket and attached to the channel member flange thereunderneath, means connecting an end portion of the lower flange of one of said channel members to one of said reciprocable members, means connecting the opposite end portion of the lower flange of the other channel member to the other of said vertically reciprocable members, and means for releasably clamping the opposite end portions of said channel members to each other.

9. The combination as specified in claim 8, wherein the attachment between the lower flange of each channel member and a vertically reciprocable member includes a spacing plate between said lower flange and said vertically reciprocable member.

10. An adjustable bearing structure, comprising an endless member, a weighted tensioning mechanism including a pulley supported upon a depending portion of said endless member, and a single means for accomplishing oscillatory adjustment in vertical direction of said pulley, said means being adapted to elevate one end portion of said pulley while simultaneously depressing the opposite end portion thereof.

11. An adjustable bearing structure, comprising an endless member, a weighted tensioning mechanism including a pulley supported upon a depending portion of said endless member, a normally horizontal axle for said pulley, and a single means for elevating an end portion of said axle while simultaneously depressing the opposite end portion thereof to oscillatably adjust said pulley in vertical direction.

EMIL A. BEYL.